United States Patent
Nozaki

(10) Patent No.: US 8,727,938 B2
(45) Date of Patent: May 20, 2014

(54) ENGINE STOP CONTROL SYSTEM FOR HYBRID ELECTRIC VEHICLE

(75) Inventor: Mikio Nozaki, Kamakura (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 239 days.

(21) Appl. No.: 13/415,042

(22) Filed: Mar. 8, 2012

(65) Prior Publication Data

US 2012/0309587 A1    Dec. 6, 2012

(30) Foreign Application Priority Data

May 30, 2011   (JP) .................................. 2011-120179

(51) Int. Cl.
*B60W 10/02*   (2006.01)
*B60W 10/06*   (2006.01)
*B60W 10/08*   (2006.01)

(52) U.S. Cl.
USPC ........................................................... 477/5

(58) Field of Classification Search
CPC ..... B60W 10/02; B60W 10/06; B60W 10/08; B60W 20/40
USPC ..................................... 477/5, 167, 174, 181
See application file for complete search history.

(56) References Cited

U.S. PATENT DOCUMENTS

| 6,018,198 A | 1/2000 | Tsuzuki et al. |
| 2009/0124453 A1* | 5/2009 | Seel et al. .......................... 477/5 |
| 2010/0197450 A1* | 8/2010 | Mittelberger et al. ............ 477/5 |
| 2010/0292047 A1* | 11/2010 | Saito ................................. 477/5 |

FOREIGN PATENT DOCUMENTS

| DE | 10 2008 002 666 A1 | 12/2009 |
| EP | 2 063 088 A1 | 5/2009 |
| JP | 2001-27171 | 1/2001 |
| JP | 2006-117206 | 5/2006 |
| JP | 2007-83796 | 4/2007 |

* cited by examiner

*Primary Examiner* — Edwin A Young
(74) *Attorney, Agent, or Firm* — Drinker Biddle & Reath LLP

(57) ABSTRACT

An engine stop control system for a hybrid electric vehicle including a powertrain having an engine, an electric motor/generator, and driving wheels, including a first clutch coupling the engine to the motor/generator, a second clutch coupling the motor/generator to the driving wheels, a controller configured to select between two driving modes of the vehicle by controlling engagement and disengagement of the first clutch and the second clutch so that the vehicle may be driven either solely by the motor/generator or a combination of the engine and the motor/generator, and to control the stop position of the engine to be a desired stop position by controlling the rotation speed of the motor/generator while the first clutch in complete engagement and the second clutch in a slip state.

11 Claims, 7 Drawing Sheets

ENGINE STOP CONTROL SYSTEM FOR HYBRID ELECTRIC VEHICLE

CROSS-REFERENCE TO RELATED APPLICATIONS

This application claims priority under 35 U.S.C. §119 to Japanese Patent Application No. 2011-1201798, filed on May 30, 2011, which is incorporated by reference herein in its entirety.

BACKGROUND OF THE INVENTION

1. Field of Invention

The present invention relates to an engine stop control system for a hybrid electric vehicle (HEV). The vehicle has a power train comprised of an engine, a first clutch, a motor/generator, a second clutch, and driving wheels arranged in this order as a torque transmission path The vehicle has two driving modes by selectively controlling an engagement or release of the first and second clutches so that the vehicle may be either electrically driven by the motor/generator only, or may be driven by both the engine and the motor/generator under a hybrid mode.

2. Description of Related Art

In a conventional hybrid vehicle of this type, a so-called one-motor, two-clutch, parallel hybrid vehicle is known in which a motor/generator is interposed between the engine and the driving wheels, and the power transmission path between the engine and the motor/generator may be selectively established by a first clutch, while the power transmission path between the motor/generator and the driving wheels may be selectively established by the second clutch.

The HEV may select an EV mode by releasing the first clutch with the second clutch engaged so that the vehicle is driven by the motor/generator only. The HEV may alternatively select a HEV mode by engaging both the first and second clutches so that the vehicle runs under a collaboration of the engine and the motor/generator.

In this one-motor, two-clutch parallel HEV configuration, due to the engine being disconnected from driving wheels by releasing the first clutch under the EV mode, no dragging torque of the engine will be experienced due to the engine, which has stalled as a result of a fuel cut (i.e., stopping the fuel supply). In other words, power loss due to the engine friction would not occur so that the EV mileage may be extended by reducing power consumption during the period of EV mode.

For the same reason, during a deceleration period when an accelerator pedal of the vehicle is released, energy recovery will not be sacrificed due to the engine friction, and the motor/generator may recover additional energy corresponding to the engine friction with improved energy efficiency.

An engine stop control technique of the HEV of a one-motor-two-clutch type is known. According to such an engine stop control system, in response to an engine stop associated with a driver's release of an accelerator pedal during a vehicle running state, engine will be controlled to stall or stop and the first clutch released, while maintaining the second clutch being connected.

However, in this engine stop control strategy, the engine lowers its rotation speed by the friction of the engine itself to finally come to stop with the first clutch released. Consequently, it is impossible to stop the engine at a specified crank angle position, but rather the stop position is left to take its course of nature and thus unpredictable.

When the power from the motor/generator only becomes insufficient, such as in the situations of an accelerator pedal being depressed, or when a need arises to charge a battery at a lower charged or storage state, the ease with which the engine restarts, i.e., an engine start-up performance, is greatly dependent on the crank angle at which the engine has come to stop. Therefore, in existing systems for engine stopping in which the engine stop angle will be determined by course of nature, a desirable engine stop position is not assured and the engine start-up performance remains unstable.

An alternative system has proposed a technology to control the engine stop crank angle at the position, at which an engine restart may be made easier by making use of braking force of generator which is directly connected to the engine to improve engine start-up performance. However, when applying such an engine stop crank angle control technique to the HEV of one-motor, two-clutch type, the result would be such that, during an engine stopping control, the second clutch will be released while maintaining the first clutch connected so that the rotation speed of motor/generator will be kept the same as that of the engine until the engine comes to a stop. This entails that an engine stop crank angle control is performed with the second clutch released and thus the motor/generator being released from the driving wheels. As a result, during an engine stop crank angle control period, a regenerative braking control by the motor/generator will not be able to be conducted so that worsening problem of energy recovery might be encountered.

SUMMARY OF THE INVENTION

As described herein, by performing the engine stopping crank angle control without disconnecting the motor/generator from driving wheels, the above described deterioration in energy recovery efficiency may be avoided and the objective of ensuring a predetermined engine stop crank angle control is achieved. For this purpose, the engine stop control system of the hybrid vehicle control system is configured as described below.

First, the configuration of hybrid electric vehicles (HEV) is generally explained. The HEV includes along the torque path/driveline (from upstream): an engine, a first clutch, a motor/generator, a second clutch, and driving wheels, in that order. By selectively connecting/disconnecting the first and second clutches, operation modes are selectable, and the vehicle may be driven electrically by the motor/generator only, or instead, driven under a hybrid mode by both the engine and motor/generator.

The system described herein, when stopping the engine in such an HEV, features control the stop position of the engine by controlling the first clutch in a complete connected or engaged state while controlling the second clutch in a slip-engaged state to thereby control the stop position of the engine.

According to the engine stop control system of the hybrid vehicle as described herein, since the stop position of the engine is controlled with the first clutch in a fully engaged state while the second clutch is in a slip state, an engine stop position control will be performed with the motor/generator connected to the driving wheels to allowing the second clutch in a slip-engagement state.

Therefore, during an engine stop control operation, the motor/generator assumes a regenerative braking operation and the deterioration problem in energy recovery will be solved. Specifically, the system and method describe herein enable stopping of an engine at a suitable crank angle for a good engine restart performance while enabling regenerative energy to be recouped by the motor/generator during the engine stop control process. When bringing the engine to stop in response to an accelerator opening decrease, the motor/generator is controlled so that motor/generator rotation speed follows a target motor rotation necessary for achieving a engine stop crank angle well suitable for easy engine starting with a first clutch (between the engine and the motor/generator) engaged while a second clutch (between the motor/generator and the drive wheels) is kept in a slip state. Therefore, the crank angle position at which the engine may be started easily will be guaranteed to achieve a highly stable engine starting property. In addition, since the second clutch is kept in a slip state during the engine stop crank angle stop, regenerative braking may be performed by the motor/generator to enhance an energy recovery efficiency even during this stopping control.

In one embodiment, an engine stop control system is described for a hybrid electric vehicle including a powertrain having an engine, an electric motor/generator, and driving wheels. The control system includes a first clutch coupling the engine to the motor/generator, a second clutch coupling the motor/generator to the driving wheels, and a controller. The controller is configured to select between two driving modes of the vehicle by controlling engagement and disengagement of the first clutch and the second clutch so that the vehicle may be driven either solely by the motor/generator or a combination of the engine and the motor/generator, and to control the stop position of the engine to be a desired stop position by controlling the rotation speed of the motor/generator while the first clutch in complete engagement and the second clutch in a slip state.

In another embodiment, a method is described for controlling an engine stop position of an engine a hybrid electric vehicle including a powertrain having an engine, an electric motor/generator, driving wheels, a first clutch coupling the engine to the motor/generator, and a second clutch coupling the motor/generator to the driving wheels. The method includes operating the first clutch in a complete engagement position, operating the second clutch in a slip state, and controlling the rotation speed of the motor/generator during stopping of the engine to achieve the desired stop position of the engine while the first clutch is in a complete engagement position and the second clutch is in a slip state.

In another embodiment, an engine stop control system is described for a hybrid electric vehicle including a powertrain having an engine, an electric motor/generator, and driving wheels. The control system includes a first clutch coupling the engine to the motor/generator, a second clutch coupling the motor/generator to the driving wheels, means for selecting between two driving modes of the vehicle by controlling engagement and disengagement of the first clutch and the second clutch so that the vehicle may be driven either solely by the motor/generator or a combination of the engine and the motor/generator, and means for controlling the stop position of the engine to be a desired stop position by controlling the rotation speed of the motor/generator while the first clutch in complete engagement and the second clutch in a slip state.

BRIEF DESCRIPTION OF THE DRAWINGS

The accompanying drawings, which are incorporated herein and constitute part of this specification, illustrate the presently preferred embodiments of the invention, and together with the general description given above and the detailed description given below, serve to explain features of the invention.

DETAILED DESCRIPTION OF THE PREFERRED EMBODIMENTS

In the following, an explanation of an embodiment according to the present invention will be made with reference to accompanying drawings.

Hybrid Vehicle Powertrain.

Figure 1:
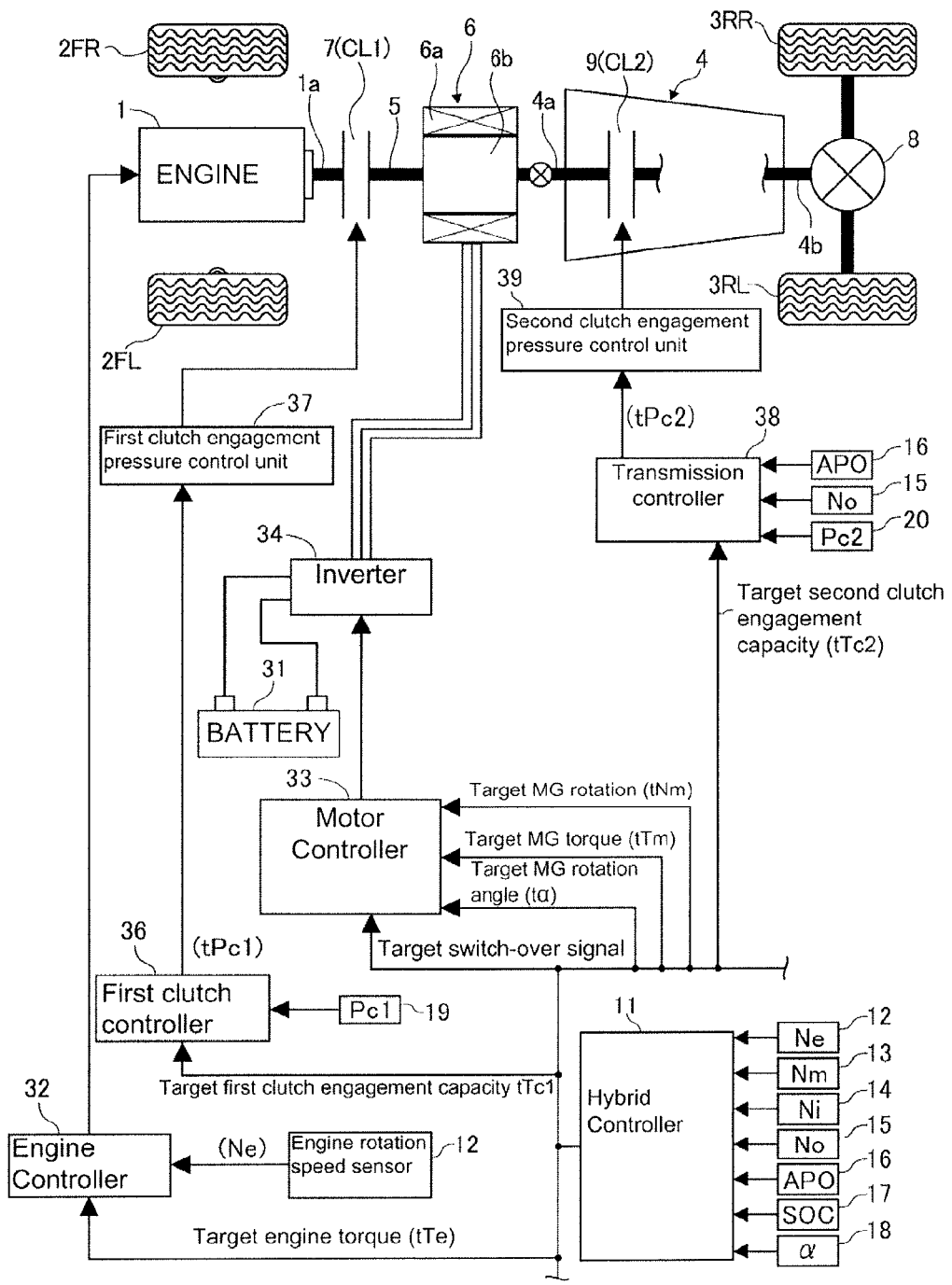
FIG. 1 is an overall system diagram illustrating a powertrain including a engine stop control system of one embodiment together with a control system thereof.

FIG. 1 shows a powertrain for a hybrid vehicle with an engine stop control system according to the embodiment described herein. This HEV is obtained by doing alterations on a conventional front engine, rear wheel drive vehicle (FR vehicle) as a base platform to obtain a HEV. In some prior systems, an engine is denoted as a power source, 2FL and 2FR denote left front wheel and right front wheel, respectively, i.e., left and right driven wheels, 3RL, 3RR denotes a left rear wheel and right rear wheel (left right driving wheels), respectively.

In the hybrid vehicle powertrain shown in FIG. 1, as in conventional rear-wheel drive vehicles, an automatic transmission 4 is arranged in a tandem configuration behind an engine 1 with respect to the vehicle longitudinal direction such that the rotation of engine 1 (specifically from crankshaft 1*a*) is transferred to an axis 5 to be coupled to an input shaft 4*a* of an automatic transmission 4 via a motor/generator 6 (power source).

The motor/generator 6 has an annular stator 6*a* mounted within a housing and a rotor 6*b* coaxially disposed within the stator 6*a* with a preset amount of air gap, and responsive to the driving condition command, and is intended to function either as an electric motor or as an electric generator. The motor/generator 6 is placed between the engine 1 and the automatic transmission 4. The motor/generator 6 has the above-mentioned axis connected to and through the center of the rotor 6*b* and uses the axis 5 as a motor/generator axis.

Between the motor/generator 6 and the engine 1, more specifically, between the motor/generator axis 5 and the engine crankshaft 1*a*, is interposed a first clutch 7 (CL1) such that a connection between engine 1 and motor/generator 6 may be selectively engagable and releasable. The first clutch 7 is configure to continuously vary the transmission torque capacity (clutch connecting capacity) and may be composed, for example, by a wet type multi-plate clutch whose transfer torque capacity (clutch capacity) may be changed by continuously controlling a clutch operating oil flow rate and clutch operative pressure by way of a linear solenoid valve.

The motor/generator 6 and the automatic transmission 4 are interconnected to each other directly by a direct coupling of the motor/generator axis 5 with the transmission input shaft 4a. The automatic transmission 4 is in general similarly structured to a conventional automatic transmission with a plurality of planetary gear sets in which a torque converter is eliminated, and instead, the motor/generator 6 is disposed for direct coupling with the transmission input shaft 4a. A plurality of speed change friction elements, such as clutches and brakes, are provided in the transmission for selectively connecting or disconnecting to establish a desired transmission path (speed change ratio) by the selected engaging or disengaging combination of the clutches and brakes.

Therefore, the automatic transmission 4 changes a rotational speed of the input shaft 4a in a selected gear ratio to output to the output shaft 4b. The output rotation is further transmitted and distributed via differential gear unit 8 to the left and right rear wheels 3RL, 3RR for propulsion of the vehicle. It is apparent to the skilled artisan in the relevant field that the automatic transmission may be of a continuously variable transmission (CVT), and not necessarily limited to the above mentioned multi-speed or staged automatic transmission, For a hybrid vehicle, although a second clutch 9 (CL2) is needed for releasing and connecting the motor/generator 6 with the driving wheels 3RL, 3RR, in the present embodiment, the second clutch 9 is not necessarily provided as an additional component to be disposed upstream of automatic transmission 4 or downstream thereof, but, alternatively, an existing speed change element for forward shifting or that for backward shifting may be adopted.

Incidentally, the existing speed change friction element for selection of forward shifting or that for selection of backward shifting for use of the second clutch 9 is intended to change a transmission or engagement torque capacity (clutch engagement capacity) continuously as in the case of the afore-mentioned first clutch 7. Thus, by using the existing speed change friction element for the forward shifting (friction element for start-up) or speed change friction element for backward shifting for performing the function of the second clutch 9 as well, in addition to a mode selection function described below by the second clutch, a power transmission state is also realized during the mode selection function, so that an extra need for a dedicated second clutch will be eliminated with a great advantage of cost reduction.

In the following, description of the mode selection function of the above-mentioned power train is made with reference to FIG. 1. In the powertrain shown in FIG. 1, when an electrically driven mode (EV mode) is required in a low-load, low vehicle speed condition including a vehicle starting operation from a vehicle stop state, the first clutch 7 is released and the automatic transmission 4 is placed in a speed change selection state (power transmission state) by engaging second clutch 9.

When driving the motor/generator 6 in this state, only output rotation from the motor/generator 6 is directed to input shaft 4a of the automatic transmission 4, which in turn converts the rotation thereto responsive to the selected speed change ratio and outputs from the transmission output shaft 4b. Rotation from the transmission output shaft 4b is then transmitted, through a differential gear device 8, to the rear wheels 3RL, 3RR. The vehicle can thus travel only by the electric motor/generator 6 (under EV mode).

When a hybrid running operation (HEV mode) is required such as at high speed driving or under a heavy load conditions, the first clutch 7 is engaged and the automatic transmission 4 is placed in an appropriate speed change state (power transmission enabling state) by engaging second clutch 9. In this state, the rotation of the output from the engine 1, or both the output rotations from the engine 1 and output speed from the motor/generator 6 reach the transmission input shaft 4a in a collaborative way, and the automatic transmission 4 changes the rotation speed of the input shaft 4a to output an appropriate speed from the output shaft 4b, depending on the gears selected. Rotation from the transmission output shaft 4b then reaches the rear wheels, 3RL, 3RR through the differential gear unit 8 to propel the vehicle by both the engine 1 and the motor/generator 6 in a hybrid running operation (HEV running mode).

While driving in the HEV running mode, when surplus energy is produced by operating the engine 1 at an optimum fuel consumption, the motor/generator 6 will be allowed to operate as a generator for the excess energy to be converted into electricity energy. The electricity power generated is stored in a battery for future use of the motor/generator 6 for a motor operation to thereby improve fuel efficiency of the engine 1.

Hereinafter, a control system is described for hybrid vehicle powertrain above described and comprised by the engine 1, the motor/generator 6, the first clutch 7 (CL1), and the second clutch 9 (CL2), with reference to FIG. 1. The control system includes a controller 11 for controlling a hybrid powertrain operating point in a collaborative or unified way. Specifically, the operating point of the powertrain may be defined by a target engine torque tTe, a target motor/generator torque tTm, a target engagement capacity of first clutch 7 tTc1 (corresponding to a first clutch engaging pressure command value tPc1), and a target engaging capacity of second clutch 9 tTc2 (corresponding to a second clutch engaging pressure command value tPc2). The hybrid controller 11 is further configured to generate a target motor/generator rotation tNm, a target motor/generator rotation angle tα, and a target switching signal for an engine stop control.

In order to determine an operating point of the powertrain as well as to generate a control signal for an engine stop, the hybrid controller 11 is supplied with a plurality of signals including a signal from an engine rotation sensor 12 that detects an engine rotation Ne, a signal from a motor/generator rotation sensor 13 that detects a rotation speed of motor/generator Nm, a signal from an input rotation sensor 14 that detects a rotation speed of the transmission input Ni, a signal of an output rotation sensor 15 that detects a transmission output rotation speed No (vehicle speed VSP), a signal of an accelerator pedal opening sensor 16 that detects an accelerator pedal stroke (accelerator opening APO), a signal from an SOC sensor 17 that detects a storage condition or state of charge (SOC) of battery 31 for storing electricity power for motor/generator 6, and a signal from a motor/generator rotation angle sensor 18 that detects a rotation angle α of the motor/generator 6.

The hybrid controller 11 selects an operation mode (EV mode or HEV mode) that can achieve the driving power the driver desires based on the accelerator opening APO, the battery storage condition SOC, and the transmission output rotation No (i.e., vehicle speed, VSP) among the above referenced information. In addition, the hybrid controller 11 calculates a target engine torque tTe, a target motor/generator torque tTm, a target first clutch engaging capacity tTc1, and a target second clutch engaging capacity tTc2.

The target engine torque tTe is supplied to the engine controller 32. The controller 32 in turn controls the engine 1 to attain the target engine torque tTe by employing controls such as a throttle opening control and fuel injection quantity control under a prevailing engine speed Ne, based on the engine rotation Ne detected by the sensor 12 and the target engine torque tTe supplied.

The target motor/generator torque tTm is supplied to the motor controller 33. The motor controller 33 in turn operates to convert a direct current from the battery 31 to alternating current by an inverter 34, and supplies the inverted current to a stator 6a of the motor/generator 6 to control the motor/generator 6 to match the motor/generator torque with target motor/generator torque tTm.

When the target motor/generator torque target tTm is determined such as to require a regenerative braking effect on the motor/generator 6, the motor controller 33 applies an appropriate amount of load for electricity generation on the motor/generator 6 so as not to overcharge the battery 31 in view of the battery charge condition SOC detected by the sensor 17. Otherwise, electricity generated by the motor/generator 6 by the regenerative braking will be converted through the inverter 34 from AC to DC for storage in the battery 31.

The target first clutch engagement capacity tTc1 is supplied to the first clutch controller 36. The first clutch controller 36 in turn compares a first clutch engagement pressure command value tPc1, corresponding to the target first clutch engagement capacity tTc1, with an engagement pressure Pc1 of the first clutch 7 detected by sensor 19. The first clutch controller 36 then performs an engagement capacity control on the first clutch 7 by controlling the engagement pressure of the first clutch 7 via a first clutch engagement pressure control unit 37 so that the first clutch engagement pressure Pc1 equals the first clutch engagement pressure command value tPc1.

The target second clutch engagement capacity tTc2 is supplied to the transmission controller 38. The transmission controller 38 in turn compares a second clutch engagement pressure command value tPc2, corresponding to the target second clutch engagement capacity tTc2, with an engagement pressure Pc2 of the second clutch 9 detected by sensor 20. The transmission controller 38 then performs an engagement capacity control on the second clutch 9 by controlling the engagement pressure of the second clutch 9 via a second clutch engagement pressure control unit 39 so that the second clutch engagement pressure Pc2 equals the second clutch engagement pressure command value tPc2.

Note that the transmission controller 38 seeks the preferred gear ratio from the current gear ratio based on a map prepared using the transmission output rotational speed detected by the sensor 15 (vehicle speed, VSP) and the accelerator opening APO detected by sensor 16 and causes a gear shift from the current gear ratio to the preferred gear ratio. In the preferred gear ratio, one of the set of gear shift friction elements to be engaged by the preferred gear ratio will be commonly used to act as the above described second clutch 9 subjected to capacity control.

Engine Stop Control.

Figure 2:
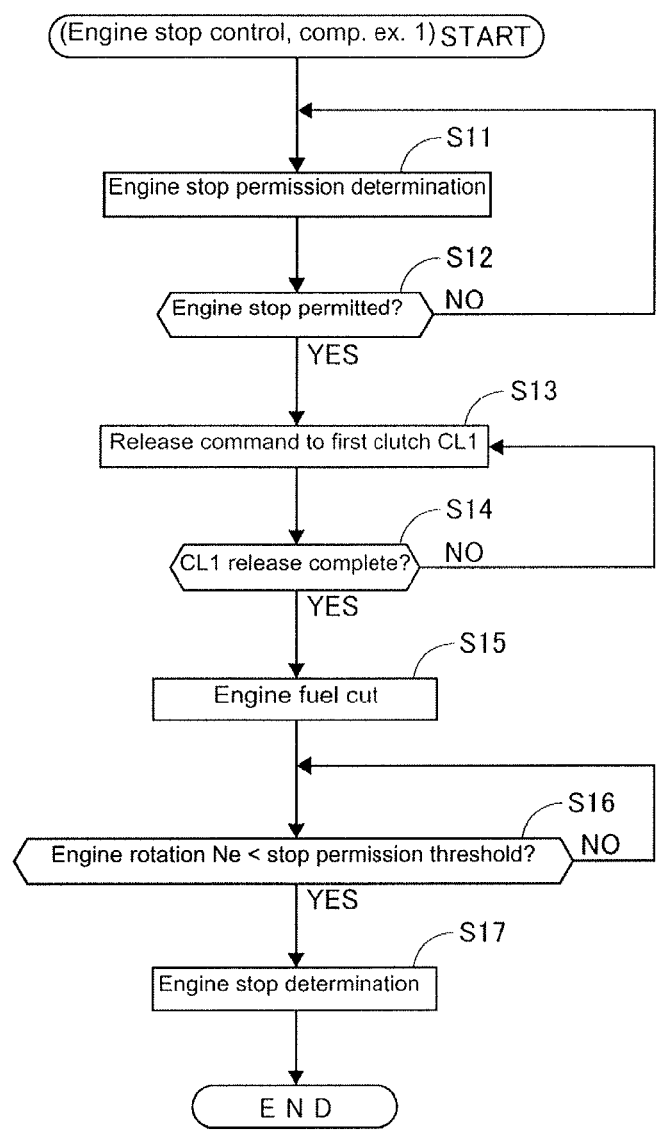
FIG. 2 is a flow chart illustrating an engine stop control process according to an Comparative Example 1, which is executed by a hybrid controller disclosed in FIG. 1.
Figure 3:
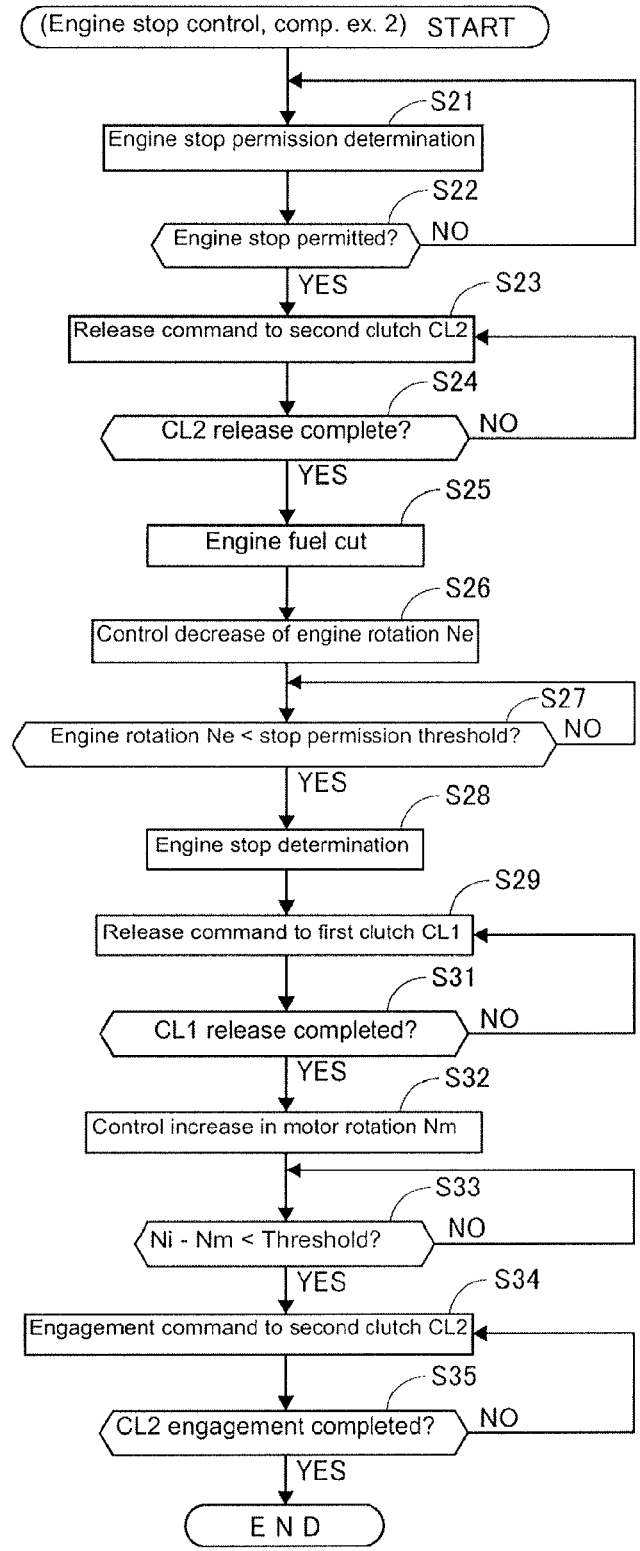
FIG. 3 is a flow chart illustrating an engine stop control process according to an Comparative Example 2, which is executed by a hybrid controller disclosed in FIG. 1.
Figure 4:
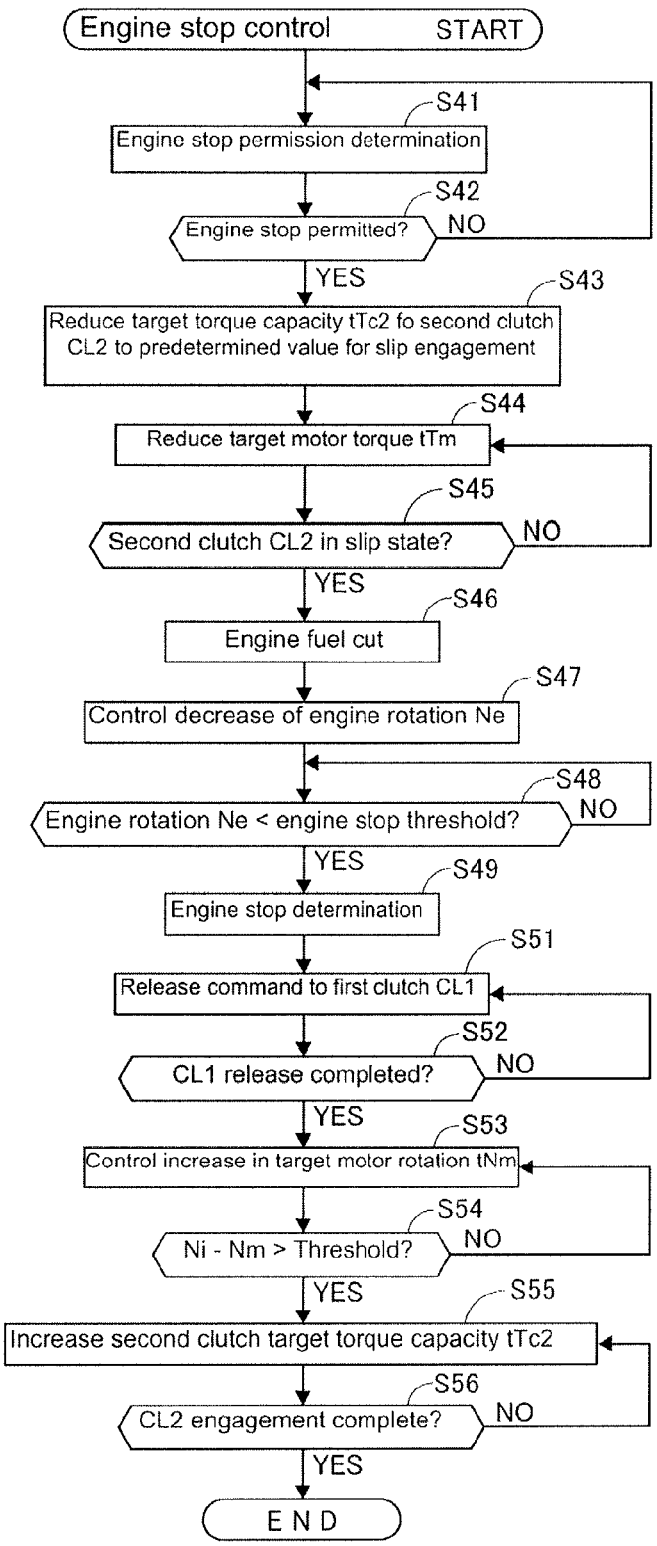
FIG. 4 is a flow chart illustrating an engine stop control process according to a presently disclosed embodiment, which is executed by a hybrid controller disclosed in FIG. 1.

Although the above description is a summary of a normal control performed by the control system in FIG. 1, in this embodiment, however, for ease of understanding of the present invention, a hybrid controller 11 in FIG. 1 is employed to execute the control process in FIG. 4 for an engine stop control according to the present invention, instead of the engine stop control process in Comparative Examples 1 and 2, shown in FIGS. 2 and 3, respectively.

First, the engine stop control of Comparative Example 1 shown in FIG. 2 is explained along with associated problems. An engine stop control shown in FIG. 2 corresponds to the engine stop control in an existing system.

Figure 5:
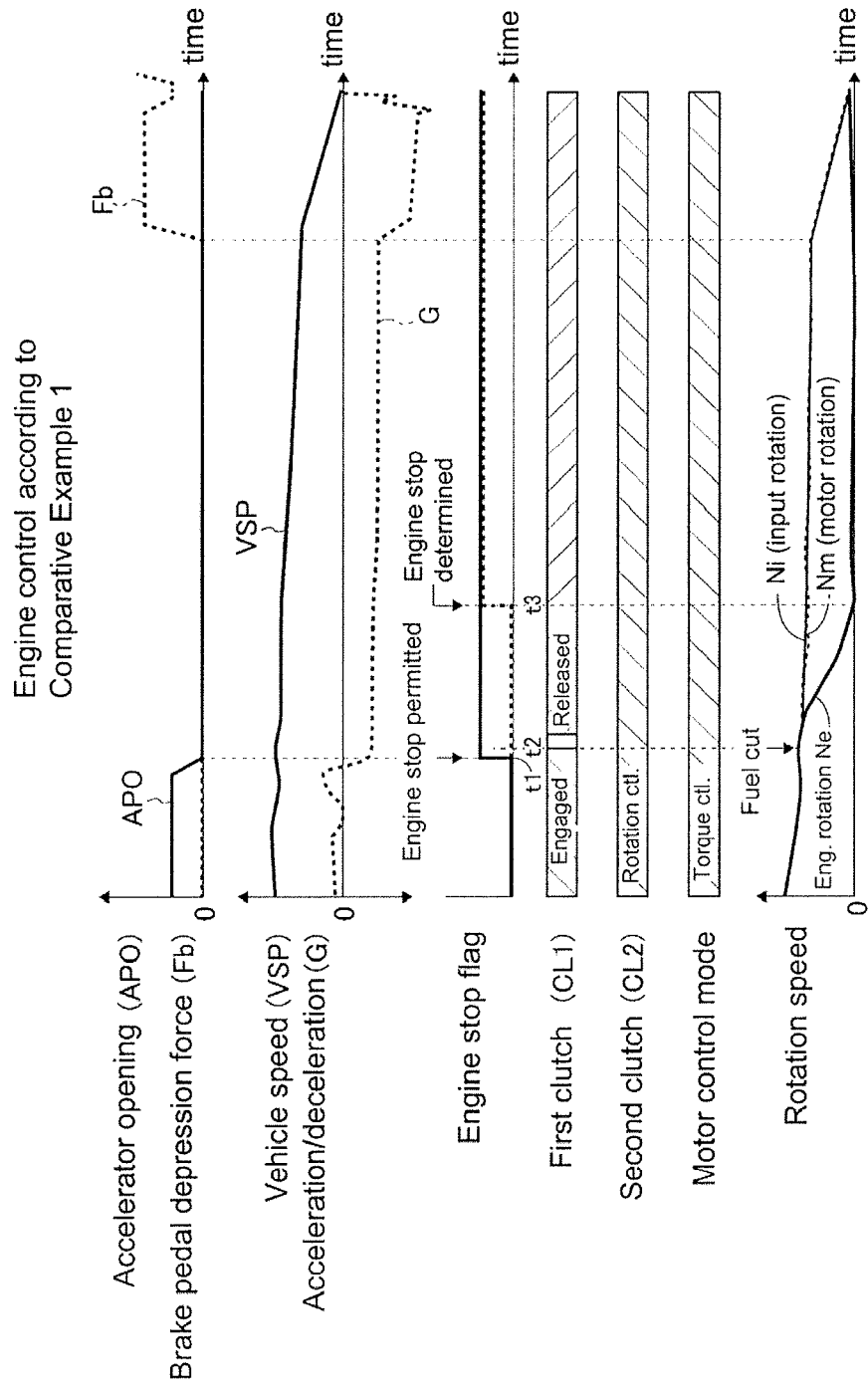
FIG. 5 is a time chart illustrating an engine stop operation based on the control process of Comparative Example 1 in FIG. 2.

First, in step S11, a decision on the engine stop permission is made where a check or determination is made for presence of a condition that allows the engine to. For example, the engine may have permission to stop in response to a decrease of the accelerator opening APO to near zero as shown in FIG. 5. In step S12, based on the determination result in step S11, a check is made as to whether the engine is permitted to stop.

Until time t1 in FIG. 5 at which a determination is made at step S12 that the engine is permitted to stop, the control returns to step S11 and reiterates this determination until the engine stop condition have been met.

At time t1 in FIG. 5 at which a determination is made at step S12 that the engine is permitted to stop, a command to release the first clutch 7 (CL1) is issued at step S13, and up until time t2 in FIG. 5 at which the first clutch 7 (CL1) has been determined to be completely released at step 14, step S13 is repeated to progress the release of first clutch 7 (CL1) until time t2 in FIG. 5 of complete release of first clutch 7 (CL1).

Upon a complete release of first clutch 7 at time t2 in FIG. 5 control proceeds from step S14 to step S15 and the engine 1 will be stopped by a fuel cut (target engine torque tTe is set be zero in FIG. 1). By this operation, the engine 1 is controlled to reduce its rotation Ne as shown in FIG. 5. In step S16, it is determined whether the engine rotation speed Ne falls below the engine stop determination threshold at time at t3 in FIG. 5. When the engine speed Ne is less than the engine stop determination threshold, control proceeds to step S17 in which a determination of stalling or stop of the engine 1 is made and the engine stop control is concluded.

According to the engine stop control in the above described, Comparative Example 1 illustrated in FIGS. 2 and 5, the first clutch 7 (CL1) is released at time t2 while the second clutch 9 (CL2) is being engaged (step S13 and step S14) and, under these conditions, an engine stop manipulation (step S15) is effected.

However, in the engine stop control such as shown in FIGS. 2 and 5, since the engine 1 will be stopped (at step S15) while maintaining the first clutch 7 (CL1) disengaged, the engine 1 reduces its rotation speed Ne by way of its own rotational friction as shown in FIG. 5 to come to final stop at time t3. Therefore, the crank angle at which the engine stops will be left to take its own course and it is impossible to have the engine stop at a given or prescribed crank angle.

In this connection, it should be noted that, when the vehicle is underpowered when driven only by the motor/generator 6, such as when the accelerator pedal is depressed, or when a need arises to charge the battery 31 responsive to decrease in storage condition SOC, the engine 1 may be restarted. The ease of starting the engine (engine start property) heavily relies on the crank angle position at which the engine stops (engine stop crank angle).

In the engine stop control shown in FIGS. 2 and 5, the crank angle of the engine stop is entirely dependent upon course of nature and unpredictable. Therefore, there is no guarantee of obtaining the engine 1 to be stopped at a specific crank angle position for ease of engine restart without involving a problem of unstable engine start.

As noted above, a conventional technique is already proposed in which by making use of braking force of the generator directly connected to the engine, the engine stop crank angle is manipulated for ease of engine restart. Assuming that this technique is applied to the engine stop technique illustrated in FIGS. 2 and 5 for use in a hybrid vehicle shown in FIG. 1, the engine stop control would be such as depicted in FIGS. 3 and 6 as a Comparative Example 2.

In the following, description is made of the Comparative Example 2 with reference to FIGS. 3 and 6 along with the problems associated therewith.

Figure 6:
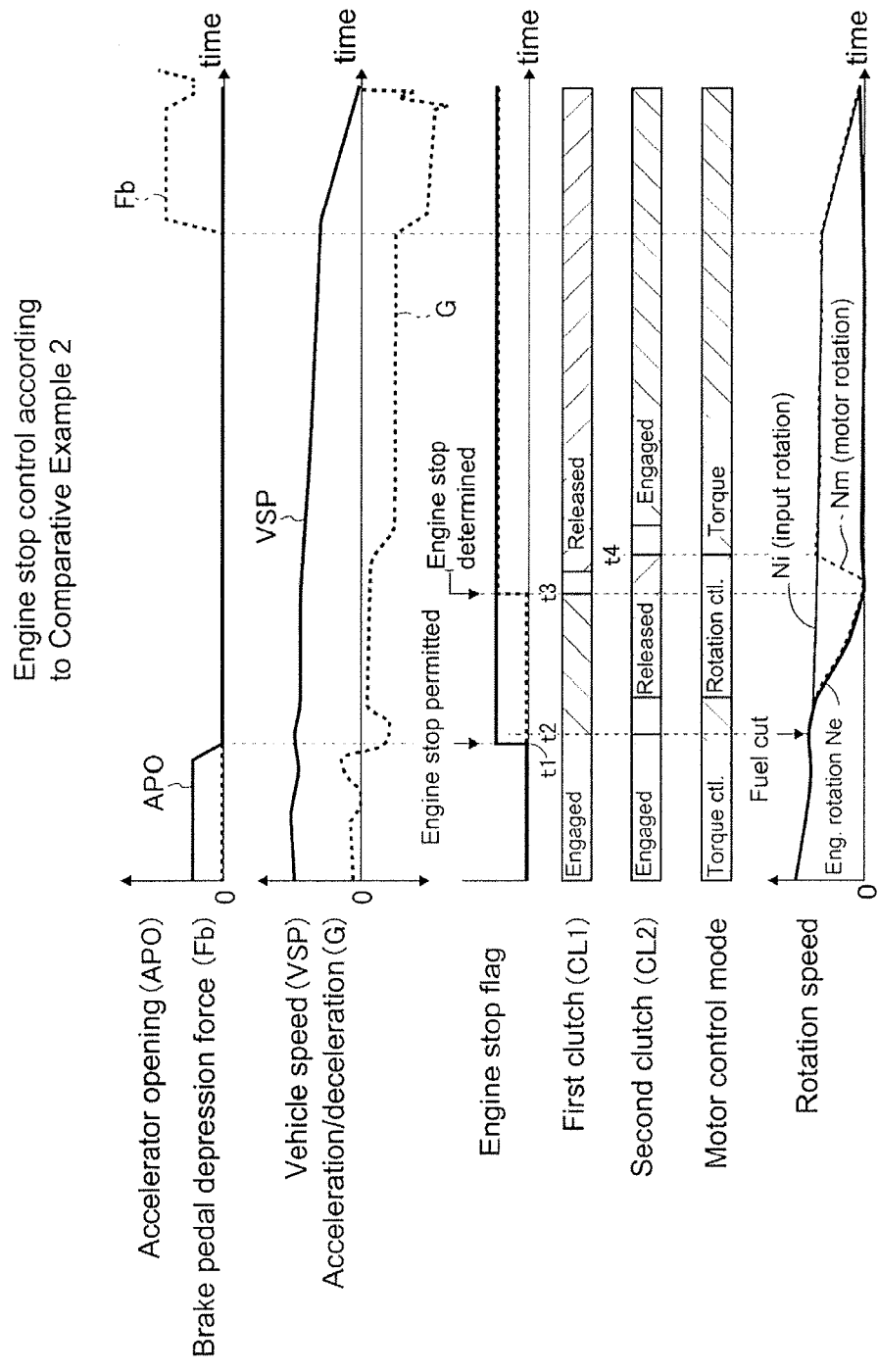
FIG. 6 is a time chart illustrating an engine stop operation based on the control process of Comparative Example 2 in FIG. 3.

First, in step S21, an decision on the engine stop permission is made where a check or determination is made for presence of a condition that permits the engine to stop such as in response to a decrease of the accelerator opening APO near zero as shown in FIG. 6, for example.

In step S22, based on the determination result in step S21, a check is made as to whether the engine is allowed to stop.

Until time t1 in FIG. 6 at which a determination is made at step S22 that the engine is allowed to stop, the control returns to step S21 and reiterates this determination until the engine stop condition has been met.

At time t1 in FIG. 6 at which a determination is made at step S22 that the engine is allowed to stop, control advances to step S23 and a command issues that the second clutch 9 (CL2) be released, and up until time t2 in FIG. 6 at which the second clutch 9 (CL2) has been determined to be completely released at step 24, step S23 is repeated to progress the release of the second clutch 9 (CL2) until time t2 in FIG. 6 of complete release of second clutch 9 (CL2).

Upon complete release of second clutch 9 (CL2) at time t2 in FIG. 6, control proceeds to step S25 in which the engine 1 will be stopped by a fuel cut (target engine torque tTe is set zero in FIG. 1). By this operation, the engine 1 lowers its rotation speed Ne as shown in FIG. 6. However, the decrease in engine rotation speed over time will be regulated within a predetermined change rate over time (velocity) by a motor speed control in step S26.

Specifically, in step S26, in order to adjust the engine stop crank angle (motor/generator rotation angle) to a crank angle suitable for an excellent engine starting property (target motor/generator rotation angle tα), a required target motor/generator (MG) rotation speed tNm for realizing a target decrease rate of the engine rotation speed Ne is sought and the rotation speed Nm of motor/generator 6 is controlled to follow the target MG rotation speed.

During a decrease in engine speed Ne by controlling the rotational speed, a check is made in step S27 to determine whether or not engine speed Ne has fallen below the engine stop permission threshold. At time t3 in FIG. 6 at which the engine rotation speed Ne falls below the engine stop permission threshold, control proceeds to step S28 and makes a stop determination on engine 1 in step S28.

At time t3 of engine stop in step S28, a release of the first clutch 7 (CL1) is issued in step S29, and up until the time at which first clutch 7 (CL1) has been determined to be released in step S31, step S29 is repeated to progress the release of first clutch 7 (CL1) to finally conclude the release operation of the first clutch 7 (CL1).

Upon completion of release of the first clutch 7 (CL1), control proceeds from step S31 to step S32, in which the rotation speed Nm of the motor/generator 6 is controlled as shown in FIG. 6 to increase at a predetermined change rate (speed) up to the transmission input rotation speed Ni. By this control, the rotation speed Nm of the motor/generator 6 approaches the transmission input rotation speed Ni as illustrated in FIG. 6. In step S33 a check is made as to whether the rotation difference or deviation between both rotation speeds falls within a prescribed value.

At time t4 at which the differential rotation (Ni–Nm) is determined to fall within the prescribed value, (i.e., Nm is nearly equal to Ni), control proceeds from step S33 to step S34. At step S34, a command to engage the second clutch 9 (CL2) is issued, and up until the time at which the second clutch 9 (CL2) has been determined to be completely engaged in step S35, step S34 will be repeated to progress the engagement process of the second clutch 9 (CL2). Step S35 concludes the engine stop control process by completion of engagement of the second clutch 9 (CL2).

However, according to the engine stop control such as shown in FIGS. 3 and 6, when stopping the engine, as shown in FIG. 6, the second clutch 9 (CL2) is released with the first clutch 7 (CL1) engaged, and the rotation speed Nm of the motor/generator 6 is thus controlled to be equal to the engine rotation speed Ne.

This control entails that an engine stop crank angle control (steps S26, S27) is conducted with the motor/generator 6 being disengaged from the driving wheels 3RL, 3RR. As a result, during the engine stop crank angle control, regenerative braking by the motor/generator 6 will not be performed with a problem that the energy recovery efficiency is deteriorated.

In a present embodiment according to the invention, by performing an engine stop crank angle control without disengaging the motor/generator 6 from the driving wheels 3RL, 3RR, the above mentioned worsening in energy recovery efficiency due to refraining from of regenerative braking will be avoided and a prescribed engine stop crank angle control is assured.

Figure 7:
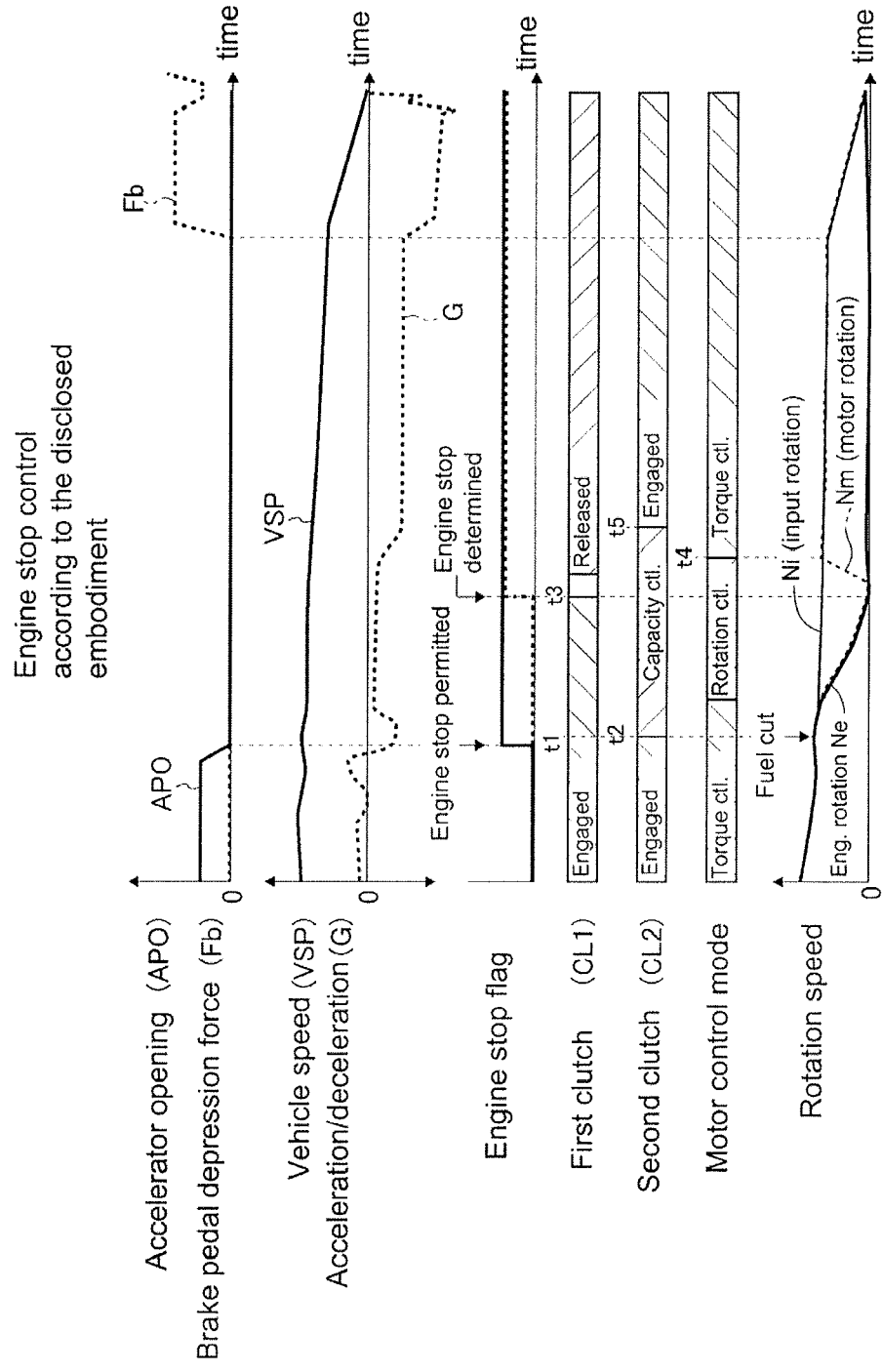
FIG. 7 is a time chart illustrating an engine stop operation based on the control process according to the present embodiment in FIG. 4.

In the present embodiment, therefore, in lieu of a control process shown in FIGS. 2 and 3 as Comparative Examples, a control process as shown in FIG. 4 is executed to perform the engine stop control as shown in FIG. 7.

First, in step S41 in FIG. 4, an decision on the engine stop permission is made where a check or determination is made for presence of a condition that allows the engine to stop, such as in response to a decrease of the accelerator opening APO near zero as shown in FIG. 7, for example.

In step S42, based on the determination result in step S41, a check is made as to whether the engine is allowed to stop.

Until time t1 in FIG. 7 at which a determination is made in step S42 that the engine is allowed to stop, the control returns to step S41 and control waits the determination that the engine stop condition has been met.

At time t1 in FIG. 7 at which a determination is made in step S42 that the engine is allowed to stop, control advances to step S43 to reduce the target torque capacity tTc2 of the second clutch 9 (CL2) to a predetermined value necessary for allowing the second clutch 9 (CL2) into a slip engagement condition. It should be noted that the predetermined value for the target torque capacity tTc2 necessary for holding the second clutch 9 (CL2) in a slip state is a torque capacity corresponding to a target regenerative braking torque. In the subsequent step S44, the target motor torque tTm will be reduced to facilitate bringing second clutch 9 (CL2) into a slip state.

In step S45, a check is made as to whether the second clutch 9 (CL2) is placed in a slip state, and if not, control returns to step S44 to further reduce target motor torque tTm. By this control strategy, at time t2 in FIG. 7 at which is determined that the second clutch 9 (CL2) is set in a slip engagement state at step S45, control proceeds to step S46 at which engine 1 will be stopped by a fuel cut (target engine torque tTe is set to be zero).

This action causes the engine 1 to decrease its rotation speed Ne as shown in FIG. 7 and the engine rotation speed decrease during this period will be performed in accordance with a predetermined change rate over time (speed).

Put another way, in step S47, a target MG rotation speed tNm is obtained that is necessary to reduce the engine rotation speed Ne at the above described change rate over time (speed), and the motor/generator 6 is feedback controlled based on the difference between the actual motor generator rotation Nm and the target MG rotation speed tNm to follow the target MG rotation tNm.

Further in step S47, upon the engine rotation speed Ne falling below a predetermined small threshold, the control mode of the motor/generator 6 will be changed or switched from the rotation feedback mode to a rotation angle feedback mode.

When performing the rotation angle feedback control, a target motor/generator rotation angle tα is obtained that is superior in engine start-up performance, and control is performed on the motor/generator 6 via a rotation angle feedback based on the deviation of an actual motor/generator rotation angle α from the target motor/generator rotation angle tα so as to match the former to the latter.

During a decrease in engine speed Ne by controlling the rotational speed of the motor/generator 6 by a rotation speed feedback, a check is made in step S48 to determine whether or not engine speed Ne has fallen below the engine stop permission threshold.

At time t3 in FIG. 7 at which engine rotation speed Ne falls below the engine stop permission threshold, control proceeds to step S49 and makes a stop determination on engine 1 in step S49.

At time t3 of an engine stop determination in step S49, a release command of the first clutch 7 (CL1) is issued in step S51. Up until the time at which first clutch 7 (CL1) has been determined to be completely released in step S52, step S51 is repeated to progress the release of the first clutch 7 (CL1) to finally conclude the release operation of the first clutch 7 (CL1). as shown in FIG. 7.

Upon completion of release of the first clutch 7 (CL1), control proceeds from step S52 to step S53, in which the rotation speed Nm of the motor/generator 6 is controlled as shown in FIG. 7 to increase at a predetermined change rate (speed) by increasing the target motor rotation tNm and controlling the transmission input rotation speed Ni accordingly.

By this control, the rotation speed Nm of the motor/generator 6 approaches the transmission input rotation speed Ni as illustrated in FIG. 7. In step S54 a check is made as to whether the rotation difference of both two rotation speeds is within a prescribed value.

Prior to the time at which the differential rotation (Ni–Nm) is determined below the prescribed value, (i.e., Nm is nearly equal to Ni) in step S54, control returns to step S53 and continues to increase the rotation speed of the motor/generator 6. After time t4 in FIG. 7 at which the difference rotation (Ni–Nm) falls below the predetermined value such that Nm is nearly equal to Ni, control proceeds from step S54 to step S55, and return to step S53 will be inhibited so that the motor/generator 6 will now be switched from a rotation control to a normal torque control, as shown in FIG. 7.

At time t4 at which the rotation difference (Ni–Nm) is determined to fall below the predetermined value (Nm is nearly equal to Ni), as described above, step S55 is selected to increase a target torque capacity tTc2. Thus, the second clutch 9 which has been maintained in a slip engagement state in steps S43 through S45, is controlled to head for the initial, complete engagement state.

In step S56, a check is made whether or not the second clutch 9 (CL2) has been fully engaged to be in a complete engagement state. Prior to the complete engagement state which is indicated at time t5 in FIG. 7, control is returned to step S55 to progressively advance the engagement process of the second clutch 9 (CL2). After time t5 in FIG. 7 at which the second clutch 9 (CL2) is in complete engagement, the engine stop control in FIG. 4 will be terminated by exiting the control loop of FIG. 4, without returning from step S56 to step S55.

Effects of the engine stop control described in reference to the above-described embodiment depicted in FIGS. 4 and 7 are explained below.

In the step S47 in FIG. 4, when stopping the engine 1 as shown between time t2 and time t3, a target motor/generator rotation angle tα is obtained, and the motor/generator 6 will be feedback controlled to match its rotation angle α with the above referenced target motor/generator rotation angle tα. Therefore, the crank angle the engine 1 assumes when stopped is set with certainty for superior engine start up performance so that engine 1 may be started with ease. Thus, the above described problem in Comparative Example 1 as explained in FIGS. 2 and 5 will be solved and the problem of a unstable start up of engine may be resolved.

In addition, since the second clutch 9 (CL2) is kept in a slip state during the above described engine stop control (engine stop crank angle control) according to the present embodiment, the above described engine stop control (engine stop crank angle control) will be performed without disconnecting the motor/generator 6 from the driving wheels 3RL, 3RR. During this engine stop control (engine stop crank angle control), regenerative braking by the motor/generator 6 is available so that the problem identified in the Comparative Example 2 referring to FIGS. 3 and 6 of deterioration in energy recovery efficiency will also be resolved.

Moreover, in the present embodiment, since the second clutch 9 (CL2) is controlled in the above described slip state to have the engagement torque capacity tTc2 corresponding to the regenerative braking torque according to the driving conditions as explained in step S43, the second clutch 9 (CL2) is placed in such a slip state just enough for the target regenerative braking torque that the regenerative braking torque will be recovered to meet the target, and the above effect will be even more noticeable.

Still further, when performing a rotation decrease control (engine stop control in step S47) during time t2 and time t3 in FIG. 7, the engine rotation speed Ne will be decreased through a rotation feedback control to zero at the predetermined change rate over time, so that the time necessary for stopping engine 1 may be managed and shortened.

Other Examples.

Note that in the above embodiment, as shown in FIG. 1, description is made for a hybrid vehicle of front engine, rear wheel drive type in which left and right rear wheels 3RL, 3RR are driven. However, the engine stop strategy according to the present invention may equally be applicable to a hybrid electric vehicle of front engine, front wheel drive type in which the left and right front wheels are driven the same way to obtain the effects described earlier.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. An engine stop control system for a hybrid electric vehicle including a powertrain having an engine, an electric motor/generator, and driving wheels, the control system comprising:
    a first clutch coupling the engine to the motor/generator;
    a second clutch coupling the motor/generator to the driving wheels;
    a controller configured to:
        select between two driving modes of the vehicle by controlling engagement and disengagement of the first clutch and the second clutch so that the vehicle may be driven either solely by the motor/generator or a combination of the engine and the motor/generator; and control the stop position of the engine to be a desired stop position by controlling the rotation speed of the motor/generator while the first clutch is in complete engagement and the second clutch is in a slip state.

2. The engine stop control system of claim 1, wherein the controller is further configured to control the second clutch in the slip state to have an engagement torque capacity corresponding to a target regenerative braking torque based on the driving conditions of the vehicle.

3. The engine stop control system of claim 1, wherein the controller is further configured to control the motor/generator to cause the engine rotation speed to decrease to zero at a predetermined time rate of change.

4. The engine stop control system of claim 3, wherein the controller is further configured to switch control of the motor/generator from a rotation speed feedback mode to a rotation angle feedback mode upon the engine rotation speed falling below a predetermined small threshold in order to achieve the desired stop position of the engine.

5. The engine stop control system of claim 1, wherein the desired stop position of the engine is a position that enables the engine to be restarted easily.

6. A method of controlling an engine stop position of an engine in a hybrid electric vehicle including a powertrain having an engine, an electric motor/generator, driving wheels, a first clutch coupling the engine to the motor/generator, and a second clutch coupling the motor/generator to the driving wheels, the method comprising:

operating the first clutch in a complete engagement position;

operating the second clutch in a slip state; and controlling the rotation speed of the motor/generator during stopping of the engine to achieve the desired stop position of the engine while the first clutch is in a complete engagement position and the second clutch is in a slip state.

7. The method of claim 6, further comprising:

controlling the second clutch in the slip state to have an engagement torque capacity corresponding to a target regenerative braking torque based on the driving conditions of the vehicle.

8. The method of claim 6, further comprising:

controlling the motor/generator to cause the engine rotation speed to decrease to zero at a predetermined time rate of change.

9. The method of claim 8, further comprising:

switching control of the motor/generator from a rotation speed feedback mode to a rotation angle feedback mode upon the engine rotation speed falling below a predetermined small threshold in order to achieve the desired stop position of the engine.

10. The method of claim 6, wherein the desired stop position of the engine is a position that enables the engine to be restarted easily.

11. An engine stop control system for a hybrid electric vehicle including a powertrain having an engine, an electric motor/generator, and driving wheels, the control system comprising:

a first clutch coupling the engine to the motor/generator;

a second clutch coupling the motor/generator to the driving wheels;

means for selecting between two driving modes of the vehicle by controlling engagement and disengagement of the first clutch and the second clutch so that the vehicle may be driven either solely by the motor/generator or a combination of the engine and the motor/generator; and means for controlling the stop position of the engine to be a desired stop position by controlling the rotation speed of the motor/generator while the first clutch is in complete engagement and the second clutch is in a slip state.

* * * * *